UNITED STATES PATENT OFFICE.

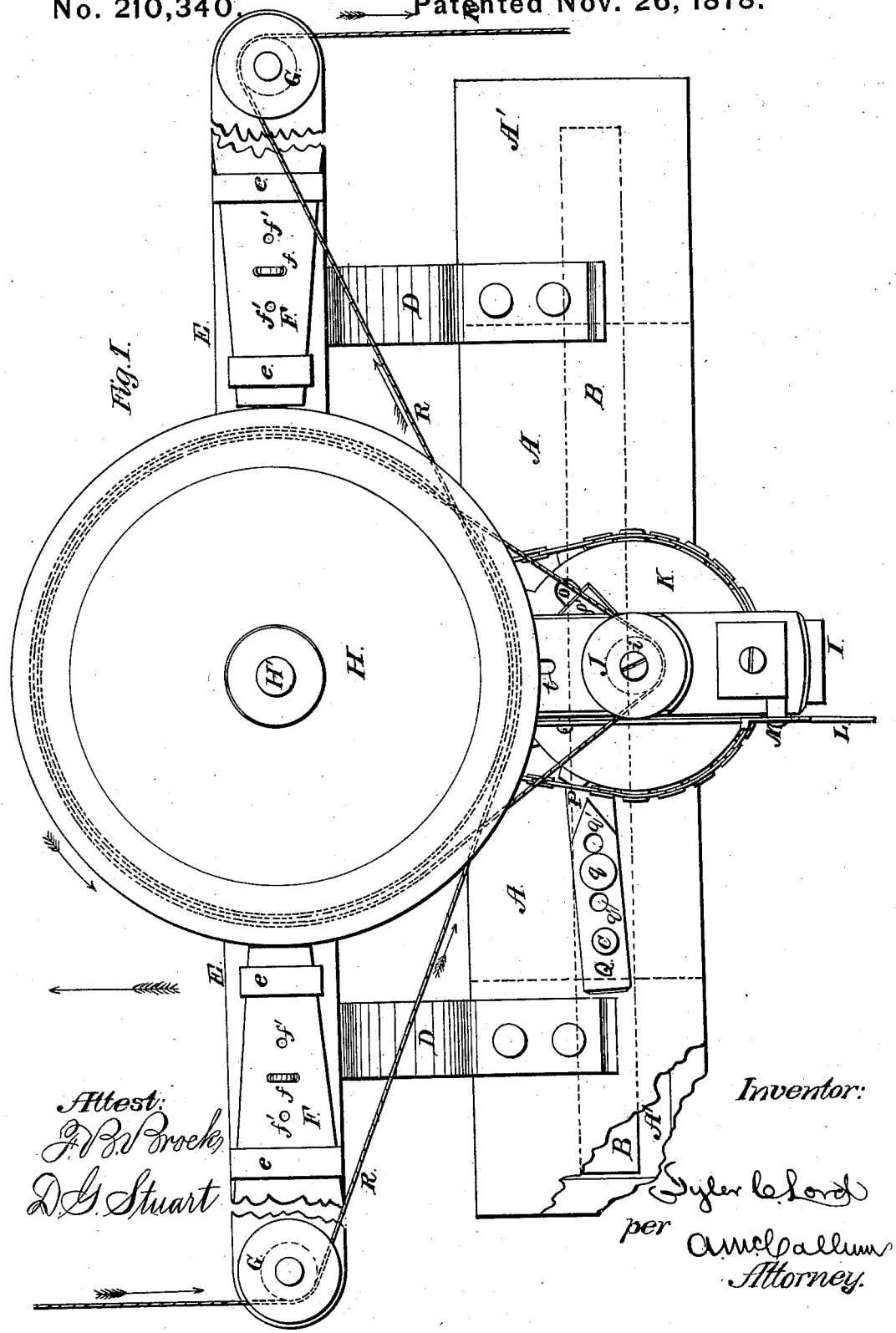

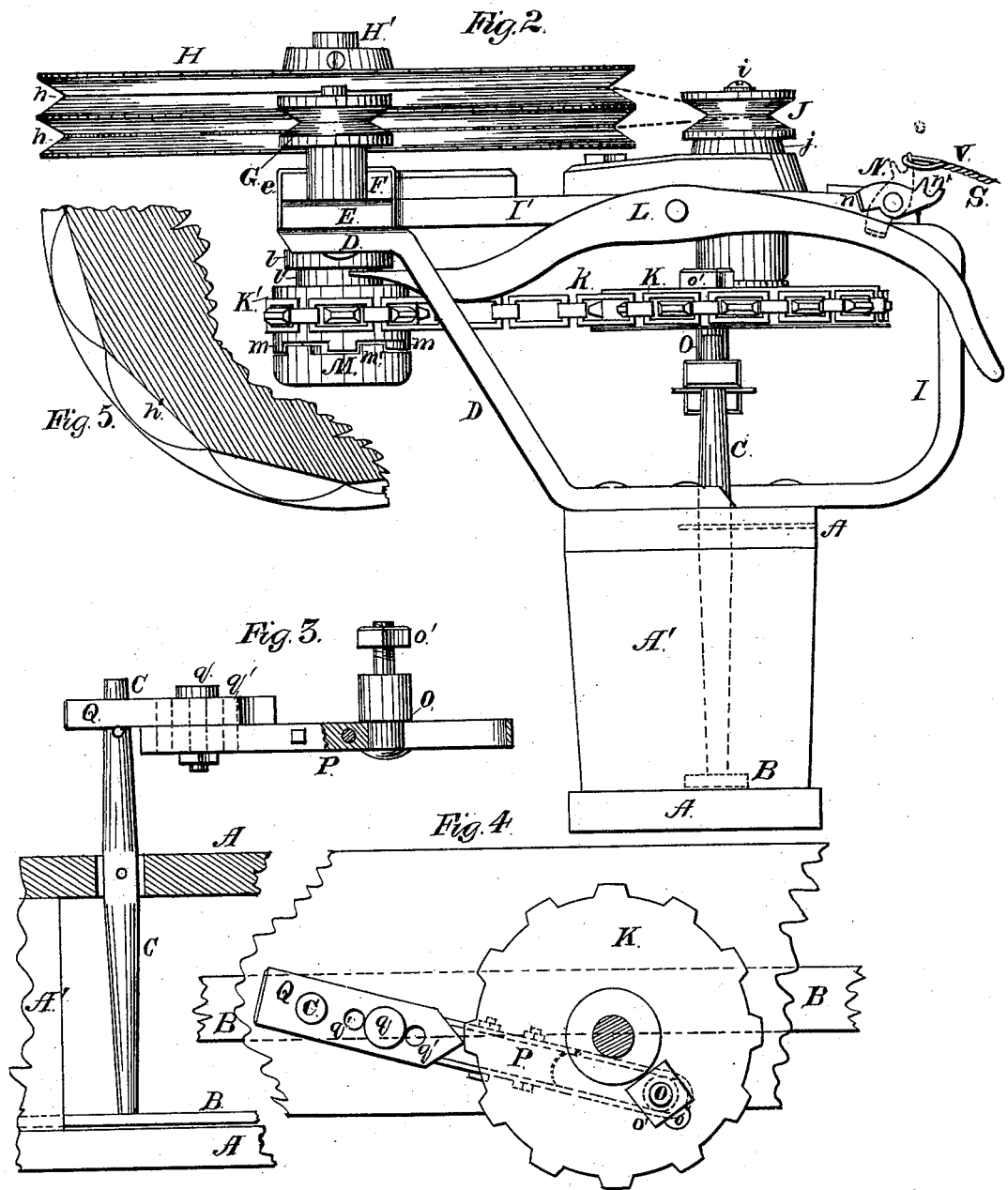

TYLER C. LORD, OF JOLIET, ILLINOIS.

IMPROVEMENT IN CHECK-ROW ATTACHMENTS FOR CORN-PLANTERS.

Specification forming part of Letters Patent No. 210,340, dated November 26, 1878; application filed June 28, 1878.

*To all whom it may concern:*

Be it known that I, TYLER C. LORD, of Joliet, in the county of Will and State of Illinois, have invented certain new and useful Improvements in Check-Row Attachments for Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in machines for planting corn, more particularly to that class of corn-planters known as "check-rowers," which drop or plant the corn in parallel rows at stated intervals apart.

The invention consists in a new and improved check-row attachment, for automatically conveying motion to the seed-slide or dropping mechanism by means of a knotless rope or wire stretched across the field to be planted, said rope operating the mechanical devices for conveying motion to the seed-slide, in the manner hereinafter more fully set forth and described.

In the accompanying drawings, Figure 1 is a plan or top view of my improved check-row attachment for corn-planters. Fig. 2 is a side elevation of the same. Fig. 3 is an elevation of a pitman attachment for operating the lever of the seed-slide. Fig. 4 is a plan view of same. Fig. 5 is a sectional view of part of the main central pulley, showing the form of the grooves thereof.

Referring to the parts by letters, A represents that part of a corn-planter to which the feed-hoppers, runners, and draft-pole are attached, A' representing the seed hoppers or boxes. B is the seed-slide, the reciprocation of which through the bottom portions of the hoppers is the means employed for dropping the corn at proper intervals apart. C is a lever for operating the seed-slide.

In machines unprovided with mechanically-operating check-row attachments this lever is operated by hand, thereby necessitating the carrying of two persons on the machine—one to operate the lever, and the other to drive the team. The object of the mechanically-operating check-row attachment is to do away with the necessity for the extra hand.

D D represent two arms or standards, which are secured to the portion A, and project upward and forward to support the cross-bar E, the ends of which are provided with loops or staples *e*. F F are extended arms, the inner ends of which are passed through the loops *e*, and secured to the cross-bar E by pins *f*, which are passed down through holes in the arms and cross-bars. The outer ends of the arms F are provided with pulleys G.

By withdrawing the pins *f*, the arms F may be removed from the bars E by drawing them out from the staples *e*; and as said arms project some distance outwardly from the machine, it will be found very convenient to remove them in this way for convenience of transportation when the planter is being moved from place to place. The arms may also be made adjustable by providing a series of pin-holes, *f'*, so that the distance between the pulleys G may be increased or diminished, as desired.

H is a large central pulley, the shaft H' of which is journaled in a suitable bearing secured to the center of the bar E. The periphery of said pulley H has two grooves, *h*, formed thereon. The bottom or periphery of these grooves I prefer to make polygonal, as clearly indicated by Fig. 5 of the drawings, and the flanges may be beveled off between the angles of the periphery, as shown at *h'*.

This polygonal form of groove prevents the rope from slipping, and thereby insures a more perfect operation of the device; but I do not limit myself to the particular form of grooves, nor do I limit myself to the use of two grooves only; and instead of a number of separate grooves, a continuous spiral groove may be employed. I prefer, however, the construction first described, and shown by the accompanying drawings.

I is an arm or bracket which connects with the center of the bar E, serving to brace it, and also forming a support and bearing for the vertical shaft *i*, the upper end of which carries a pulley, J, said pulley being loosely mounted on the shaft, and resting in frictional contact with the upper disk shaped portion of the bearing *j*.

K is a chain-wheel, which is keyed to the lower end of the shaft $i$; and $k$ is a chain, by means of which the wheel K is geared with a chain-wheel, K', of smaller diameter. This wheel K' is loosely mounted on shaft H'. Its upper portion or hub is formed with an annular flange, $l$, and groove $l'$, and its lower portion is provided with teeth $m$.

M is a toothed wheel, which is rigidly secured to a shaft, H', its teeth $m'$ corresponding with the teeth $m$ of the wheel K'. L is a lever, pivoted to the portion I' of the bracket I. Its forward end is bifurcated, so as to fit the groove $l'$ of the wheel K', and its other or free end formed into a suitable treadle or hand-lever.

N is a small lever or catch, pivoted to the standard I, one end being formed into a pressure-foot, $n$, and the other into a fork or hook, $n'$. O is a wrist-pin, secured eccentrically to the wheel K, to which it is adjustably attached by means of a radial slot, $o$, and nut $o'$. P is a slotted pitman-rod, through the slot of which the wrist-pin O passes. Q is a rod or bar, which connects the pitman with the lever C, which operates the seed-slide B. The pitman is adjustably attached to the connecting-rod Q by means of a pin, $q$, and series of holes, $q'$.

The parts of the bracket I I' and the bearing $j$, which connects them, are also made adjustable by means of a slot, $t$, the object of this adjustment being to tighten up the chain $k$, when necessary.

R is the operating-rope, and V is the anchor-trigger rope, one end of which is anchored at the end of the field, and the other provided with a loop, which is slipped between the forks $n'$ of the catch N. Any equivalent of this cord V may be used—that is, a chain, or metal rod, or wire, or a rod of wood with a loop on its end, may be used instead of the rope.

Having thus described the construction of the device, I will now proceed to describe its operation.

The rope R is stretched across the field and its ends secured in any well-known way, preferably by short stakes, which can be readily withdrawn from the soil when the machine reaches the end of the field. The rope is then passed around the pulleys in the direction of the small arrows, first around the left-hand pulley G, then around the lower groove of the pulley H, then around the pulley J, then around the upper groove of the pulley H, and from thence around the right-hand pulley G, the cord in its passage being transferred from one side of the machine to the other, and causing the pulley H to revolve, thereby turning the shaft H' and causing the wheels K' K, through connection of the chain $k$, to revolve; then, through the motion of the pitman P and lever C, imparting a reciprocating motion to the slide B, so as to drop the corn with regularity at stated intervals apart.

When the machine, which is supposed to be traveling in the direction of the large arrow, reaches the end of the field, the stake which anchors the rope at that end is withdrawn, and the rope being removed from the left-hand pulley G, and also disengaged from the other pulley G, the machine can then be turned around without requiring to remove the rope from the central pulley, H, or friction-pulley J, all that is necessary being to readjust the rope around the pulley G and insert the stake in its new position. By thus avoiding the necessity for removing and readjusting the rope on the central pulleys I effect a great saving in time.

In the passage of the rope over the pulleys the pulley J has two functions: first, it operates to transfer the rope from the lower to the upper groove of the central pulley, H; second, by reason of the friction between it and that part of the bearing $j$ with which it is in contact, it operates with a certain degree of resistance, and thereby keeps the rope taut, and preventing all danger of its slipping. The peculiar polygonal form of the grooves of the wheel H also materially aids in preventing the slipping of the rope.

The distance between the plants in the row of corn planted is, of course, dependent upon the relative proportions of the wheels K K' and the length of stroke of the pitman. Some planters prefer to plant closer or wider apart than others. By providing wheels K' of different diameters, and substituting the one for the other, the machine may be made to drop the seed as desired. Again, some farmers prefer to plant their corn in drills, to be worked only one way, the plants being, of course, much closer together.

To convert the device into a drilling-machine, a much quicker motion of the pitman is necessary. For this purpose the wheels K K' may be made interchangeable—that is, the larger wheel may be mounted on the shaft H', and the smaller one on the shaft $i$, the result being, of course, a more rapid motion of the seed-slide. The pitman being slotted, as described, will impart a sudden or quick motion to the seed-slide, so as to drop the seed with precision at the desired point.

When it is not desired that the seed-slide should operate, as in turning at the end of the field, it is thrown out of gear by the driver pressing down on the free end of the lever L, thereby raising its other end, and with it the wheel K', until the teeth $m$ clear the corresponding teeth of the wheel M, and in this position it may be secured by turning the catch N forward, or in a vertical plane, until its pressure-foot $n$ comes in contact with the lever L. By releasing the catch or removing the pressure from the end of the lever, the wheel K' will fall into gear by its own gravity, and the seeding mechanism be again operated.

In starting the machine at the end of the field, with machines of this class great difficulty is experienced in adjusting the machine to begin the planting at the proper place, the seed being covered as planted, and there being nothing to indicate the exact position of the seed in the row. I overcome this difficulty in the following manner: To the stake at the end of the rope, or to another suitable stake, I attach the cord or wire V, having a loop at the other end, which loop is passed between the forks n' of the catch N, said catch being in the vertical position indicated by Fig. 2 of the drawings, with the wheel K' out of gear. The cord being of the exact length between the stake and the beginning of the row of corn, as soon as it becomes taut, as the machine moves, it will pull the catch N into the position shown by full lines of the drawings, thereby liberating the lever L and allowing the wheel K' to drop into gear, and the planting to begin, the loop of the cord at the same time slipping out of the fork of the catch N, thereby insuring regularity in the planting without special adjustment of the machine.

The adjustment of the pitman and the position of the wrist-pin are effected by the slots and holes, as before described.

I am aware that there is nothing new in providing the machine with extended arms carrying pulleys to carry the rope from one side of the machine to the other; and I am also aware that check-rowers have been operated by means of knotless ropes, and that the rope has been passed around pulleys having four projecting arms, and that pulleys having V-shaped grooves are well known in the arts. I do not, therefore, broadly claim such as my invention.

What I claim as new, and desire to secure by Letters Patent, is—

1. In a check-row attachment for corn-planters, the double pulley H, having polygonal grooves h, constructed substantially as shown, and for the purpose specified.

2. The combination of the horizontally-operating double-grooved pulley H, pulley J, having a frictional bearing, j, and pulleys G G, operating substantially as and for the purpose specified.

3. The combination of the horizontally-operated pulley H and shaft H', with chain-wheels K' and K, wrist-pin O, slotted pitman P, and lever C, substantially as and for the purpose specified.

4. The lever L, operating in combination with the pivoted catch N, having pressure-foot n and forked end n', and with the anchored cord V, substantially as and for the purpose specified.

In testimony that I claim the foregoing as my own I affix my signature in presence of two witnesses.

T. C. LORD.

Witnesses:
   D. G. STUART,
   JOS. T. K. PLANT.